United States Patent [19]

Hummel

[11] Patent Number: 5,509,695
[45] Date of Patent: Apr. 23, 1996

[54] PRECOCKED QUICK CONNECT FLUID COUPLING HAVING A V-SHAPED HOLDING RING

[75] Inventor: Sean P. Hummel, Howell, Mich.

[73] Assignee: Pilot Industries, Inc., Dexter, Mich.

[21] Appl. No.: 456,468

[22] Filed: Jun. 1, 1995

[51] Int. Cl.⁶ ................................................ F16L 37/23
[52] U.S. Cl. ........................................... 285/23; 285/316
[58] Field of Search ...................................... 285/316, 23

[56] References Cited

U.S. PATENT DOCUMENTS

| | | | |
|---|---|---|---|
| 1,119,276 | 12/1914 | Griffith et al. | 285/316 |
| 2,279,146 | 4/1942 | Schneller | 285/316 |
| 3,407,847 | 10/1968 | Snyder | 285/316 |
| 3,836,114 | 9/1974 | Norton et al. | 285/316 |
| 4,403,959 | 9/1983 | Hatakeyama | 285/316 |
| 4,498,658 | 2/1985 | Mikiya | 285/316 |
| 4,776,614 | 10/1988 | Marrison et al. | 285/93 |
| 5,290,009 | 3/1994 | Heilmann | 285/316 |
| 5,310,226 | 5/1994 | Norkey | 285/316 |
| 5,390,963 | 2/1995 | Namekawa | 285/316 |

*Primary Examiner*—Eric K. Nicholson
*Attorney, Agent, or Firm*—Gifford, Krass, Groh, Sprinkle, Patmore, Anderson & Citkowski

[57] ABSTRACT

A quick connect fluid coupling is disclosed for use with a tubular and cylindrical nipple having an annular recess at a position spaced from its free end. The quick connect coupling includes a tubular and cylindrical body open at each end and wherein the first end of the body is coaxially disposed over the nipple. The body includes a plurality of circumferentially spaced and radially extending openings which register with the recess and the nipple once the body is moved to its connected position. A spherical retainer is positioned within each radial opening and these retainers are radially movable between an inner locked position in which a portion of each retainer is positioned within the recess, and an outer unlocked position in which the retainers are spaced outwardly from the recess. A locking collar is disposed coaxially around the body and is axially movable between an extended and a retracted position. In its extended position, a cam surface in the collar coacts with the retainers to move the retainers from their outer and to their inner locked position. An annular ring is also disposed within the first end of the body so that the ring is in alignment with the retainers. The outer periphery of the ring maintains the retainers in their outer unlocked position and simultaneously maintains the locking collar in its retracted cocked position until insertion of the body over the nipple.

6 Claims, 2 Drawing Sheets

PRECOCKED QUICK CONNECT FLUID COUPLING HAVING A V-SHAPED HOLDING RING

BACKGROUND OF THE INVENTION

1. Field of the Invention

The present invention relates generally to fluid couplings and, more particularly, to a quick connect fluid coupling.

2. Description of the Prior Art

There are many previously known quick connect fluid couplings which are especially adapted for use with a tubular and cylindrical nipple having an annular and circumferentially extending recess at a position spaced from the free end of the nipple. One such fluid coupling is utilized with a gas tank for an automotive vehicle.

These previously known quick connect couplings typically comprise a tubular and cylindrical body having a first, second end and a fluid passageway extending between the ends of the body. The first end of the body is movable between a disconnected position in which the body is spaced from the nipple, and a connected position, in which the nipple is axially received within the first end of the body. Additionally, the body includes a plurality of circumferentially spaced and radially extending openings which register with the annular recess in the nipple when the body is moved to its connected position.

A retainer, such as a ball, is positioned within each radially extending opening in the body. The retainers are radially movable between an inner locked position and an outer unlocked position. In their inner locked position, a portion of the retainer is positioned within the nipple recess thus locking the coupling and nipple together. Conversely, in their outer unlocked position, the retainers are spaced outwardly from the recess thus permitting the coupling and nipple to be axially moved relative to each other.

A locking collar is disposed coaxially around the body and is axially movable between an extended position and a retracted position. The locking collar includes a cam surface which coacts with the retainers to move the retainers from their outer unlocked position and to their inner locked position as the locking collar moves from its retracted and to its extended position. Furthermore, a spring resiliently urges the locking collar towards its extended position.

One disadvantage of these previously known quick connect couplings, however, is that the locking collar must be manually held in its retracted or cocked position against the force of the spring in order to make the initial connection between the coupling and the nipple. While in some situations, the collar can be simply manually moved to its retracted position in order to connect the coupling to the nipple, in many other situations it is difficult to maintain the locking collar in its retracted position while the connection is made. This is particularly true in space-limited applications where there is insufficient space to allow the workman's hand to fit around and hold the locking collar while the connection is made. Furthermore, even in situations where space limitations do not present a problem, repetitively moving the collar to its cocked position, e.g. on an assembly line, is both tedious and tiresome.

SUMMARY OF THE PRESENT INVENTION

The present invention provides a quick connect coupling which overcomes all of the above-mentioned disadvantages of the previously known devices.

In brief, the quick connect coupling of the present invention, like the previously known quick connect couplings, includes a tubular and cylindrical housing open at each end and having a fluid passageway extending between the ends. Retainers are positioned in radial openings provided around the body while a locking collar is also disposed coaxially around the body and includes a cam surface which coacts with the retainers to move their retainers to their locked position. Like the previously known quick connect couplings, a spring or other resilient means urges the locking collar towards its extended or locked position.

Unlike the previously known quick connect couplings, however, the present invention includes an annular ring which is disposed coaxially within the first end of the coupling body so that the ring is aligned with the retainers. Furthermore, the outer periphery of the ring abuts against the inner periphery of the retainers and the ring is dimensioned to maintain the retainers in their outer unlocked position. This, in turn, simultaneously retains the locking collar in its retracted or cocked position.

The ring has substantially the same diameter as the diameter of a portion of the nipple. Consequently, with the ring positioned within the interior of the coupling body and the locking collar thus maintained in its retracted or cocked position, insertion of the body over the nipple causes the nipple to axially displace the ring thus freeing the retainers. Once the retainers move into alignment with the annular recess of the nipple, the locking collar, under the force of its spring, moves to its extended or locked position thus completing the connection between the coupling and nipple.

Preferably the body and locking ring are each of a one piece plastic construction.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
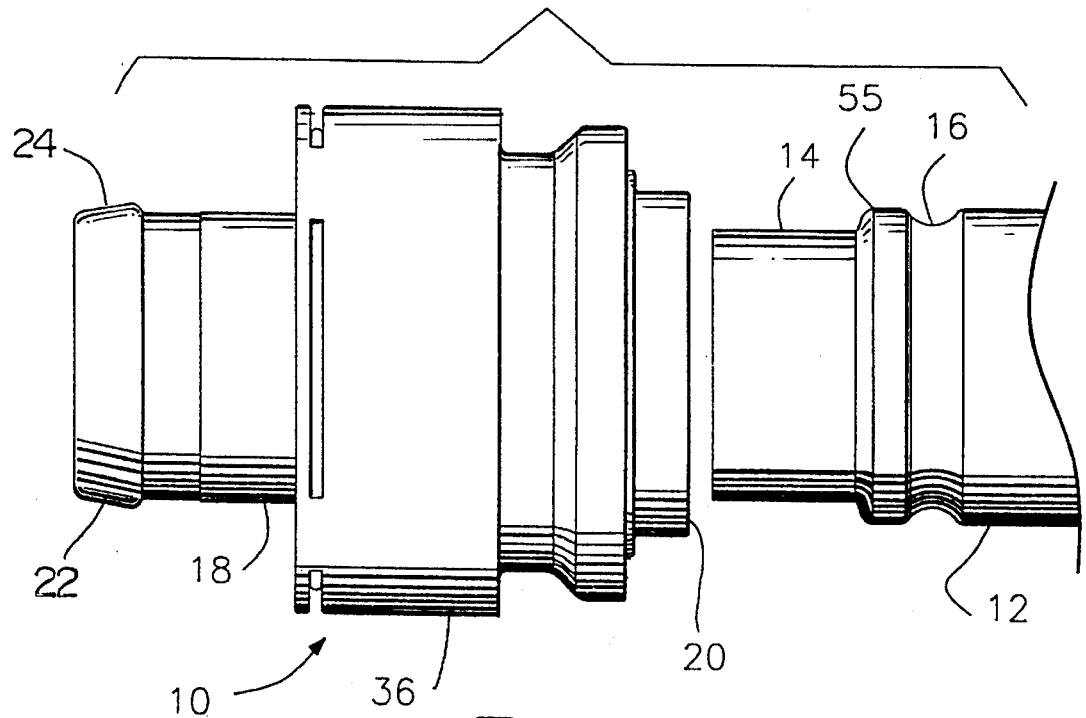
FIG. 1 is a side exploded view illustrating a preferred embodiment of the present invention and a nipple.

With reference first to FIG. 1, a preferred embodiment of the quick connect coupling 10 of the present invention is there shown for use with a tubular and cylindrical nipple 12. The nipple 12 includes a free end 14 as well as a circumferentially extending annular recess 16 formed around the nipple 12 at a position spaced from its free end 14.

Figure 2:
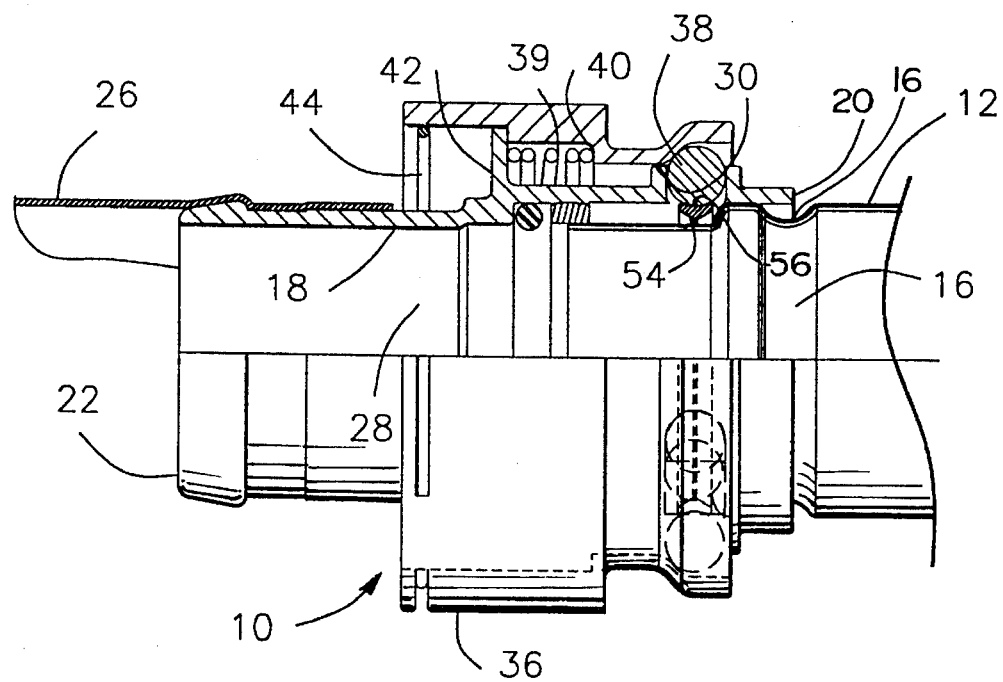
FIG. 2 is a longitudinal sectional view illustrating the preferred embodiment of the present invention in a disconnected position.

With reference now to FIGS. 1 and 2, the quick connect coupling 10 comprises a tubular and cylindrical elongated housing 18 having a first end 20 and a second end 22. The first end 20 of the body 18 is dimensioned to be slidably coaxially disposed around the nipple 12 while the other end 22 includes a lip 24 or other conventional means for connection with a fluid conduit 26 (FIG. 2). A fluid passageway 28 (FIG. 2) fluidly connects the ends 20 and 22 of the body 18 together.

Figure 3:
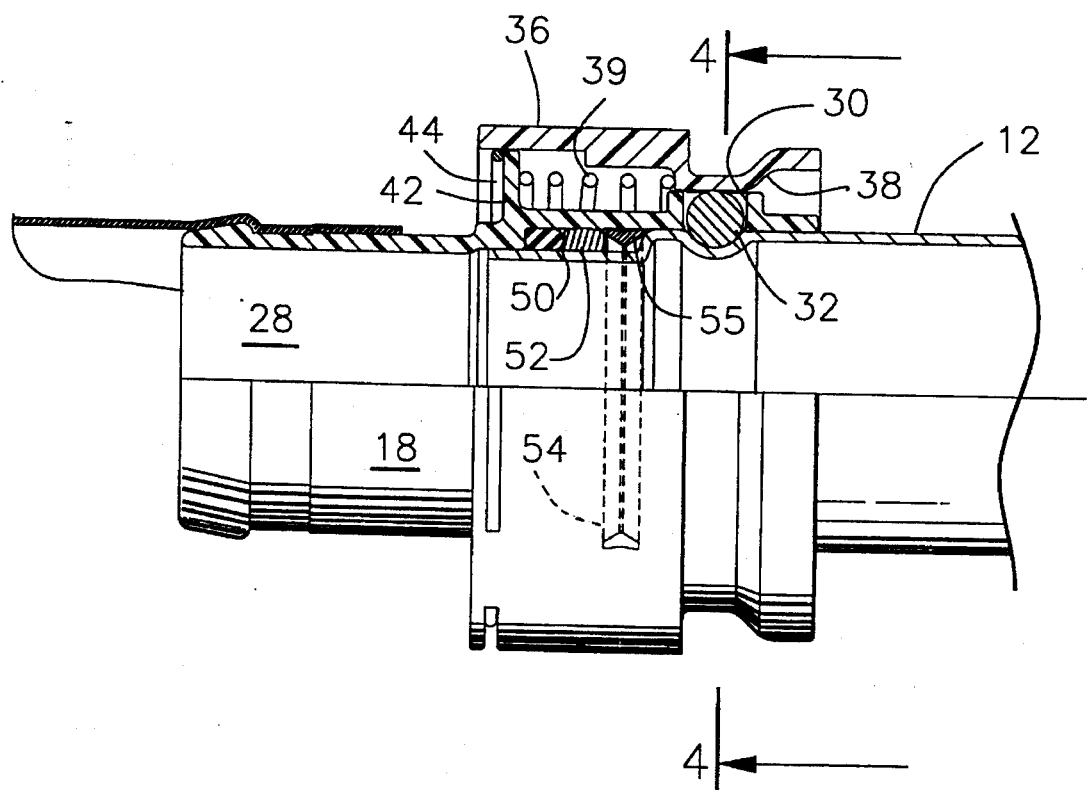
FIG. 3 is a view similar to FIG. 2, but illustrating the coupling in its connected position.
Figure 4:
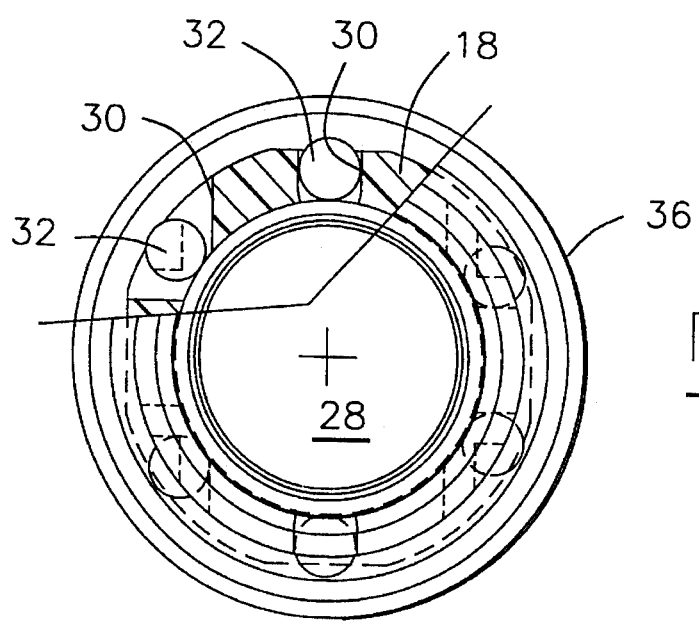
FIG. 4 is a cross-sectional view taken substantially along line 4—4 in FIG. 3.

With reference now to FIGS. 2 and 4, the body 18 includes a plurality of circumferentially spaced and radially extending openings 30 at a position spaced from the end 20 of the body 18. When the body 18 is moved from a disconnect position (FIG. 2) to a connected position (FIG. 3) in which the nipple 12 is contained within the interior of the body 18, the openings 30 register with the nipple recess 16 as best shown in FIG. 3.

Referring now to FIGS. 2 and 3, a retainer 32, such as a spherical ball, is positioned within each opening 30. These retainers 32 are radially movable between an outer unlocked position, illustrated in FIG. 2, and an inner locked position, illustrated in FIG. 3. In their locked position (FIG. 3) a portion of each retainer 32 is positioned within the nipple recess 16 thus locking the body 18 to the nipple 12. Conversely, in their radially outer unlocked position (FIG. 2) the retainers 32 allow the body 18 and nipple 12 to move axially relative to each other.

Referring again to FIGS. 2 and 3, a tubular and cylindrical locking collar 36 is disposed coaxially around the body 18. The collar 36 is movable between a retracted or cocked position, illustrated in FIG. 2, and an extended or locked position, illustrated in FIG. 3. This locking collar 36 includes a cam surface 38 which coacts with the retainers 32 to move the retainers from their outer and to their inner position as the locking ring 36 is moved from its retracted to its extended position.

A helical spring 39 or other resilient means is entrapped in the state of compression between an abutment surface 40 formed on the collar 36 and an abutment surface 42 formed on the housing 18. The spring 39 thus normally urges the collar 36 to its extended or locked position. A retaining ring 44 is secured to the collar 36 and cooperates with the abutment surface 42 to secure the collar 36 to the body 18.

With reference now especially to FIG. 3, an annular O-ring 50 is contained within the passageway 28 of the body 18 and maintained in position by a bushing 52. Once the quick connect coupling 10 is moved to its connected position (FIG. 3), the O-ring 50 provides a fluid seal between the outer periphery of the nipple 12 and the inner periphery of the body passageway 28.

Referring now to FIG. 2, in order to maintain the locking collar 36 in its retracted or cocked position (FIG. 2) prior to connection of the coupling 10 with the nipple 12, an annular ring 54 is disposed within the coupling passageway 28 so that an outer periphery 56 of the ring 54 abuts against an inner periphery of the retainers 32. Furthermore, the ring 54 is dimensioned to hold or maintain the retainers 32 in their radially outer or unlocked position which simultaneously maintains the locking collar 36 in its cocked or retracted position.

The outer periphery 56 of the ting 54 is substantially V-shaped in cross section. This V-shape ensures that the ring 54 remains in alignment with the retainers 34 prior to connection of the coupling 10 to the nipple 12.

With reference now especially to FIG. 3, the ting 54 has substantially the same diameter as a portion 55 of the nipple 12. Thus, upon insertion of the end 20 of the body over the nipple 12, the portion 55 of the nipple 12 engages the ring 54 and axially displaces the ring 54 inwardly into the passageway 28 to the position shown in FIG. 3. Upon doing so, the retainers 32 are freed so that, upon registration with the nipple recess 16, the force of the cam surface 38 on the retainers 32 forces the retainers 32 to their radially inner or locked position and simultaneously allows the locking collar 36 to snap to its extended or locked position.

In practice, with the ting 54 in the position illustrated in FIG. 2, the quick connect coupling 10 is simply pushed onto the nipple 12. Once the coupling 10 reaches its locked position, the locking collar 36 automatically snaps from its cocked position and to its extended or locked position thus completing the connection. Furthermore, it is unnecessary for the installer to hold the collar 36 in its retracted position during the connecting operation due to the operation of the ring 54.

In the preferred embodiment of the invention, both the body 18 as well as the locking collar 36 are of a one-piece plastic construction. Furthermore, although in the preferred embodiment of the invention, the coupling 10 is intended for use with a fuel tank in an automotive vehicle, and it may be used in any desired fluid system.

Having described my invention, many modifications thereto will become apparent to those skilled in the art to which it pertains without deviation from the spirit of the invention as defined by the scope of the appended claims.

I claim:

1. A quick connect fluid coupling for use with a tubular and cylindrical nipple having an annular and circumferentially extending recess at a position spaced from a free end of the nipple, said quick connect coupling comprising:

a tubular and cylindrical body having a first end and a second end and a fluid passageway extending between said first and second ends, said first end of said body being movable between a disconnected position in which said body is spaced from said nipple and a connected position in which said nipple is axially received within said first end of said body, said body having a plurality of circumferentially spaced and radially extending openings formed therethrough which register with said annular recess when said body is in said connected position, a retainer positioned in each radially extending opening, said retainers being radially movable between an inner locked position in which a portion of each retainer is positioned in said recess and an outer unlocked position in which said retainers are spaced outwardly from said recess, a locking collar disposed coaxially around said body and axially movable between an extended position and a retracted position, said locking collar having a cam surface which coacts with said retainers to move said retainers from said outer to said inner position as said locking collar moves from said retracted to said extended position, means for resiliently urging said locking collar toward said extended position, and means for holding said retainers in said outer position until insertion of said body over said nipple, wherein said holding means comprises an annular ring contained within said body fluid passageway, said ring having an outer peripheral surface which abuts against said retainers and holds said retainers in said outer position, wherein said outer peripheral surface of said ring is substantially v shaped in cross section, said outer peripheral surface having two sides which engage portions of each of retainers on opposite sides of a radially extending plane which bisects said retainers.

2. The invention as defined in claim 1 wherein said ring has substantially the same diameter as the nipple so that, upon insertion of said body over said nipple, said nipple axially displaces said ring from said retainers.

3. The invention as defined in claim 1 wherein said retainers are balls.

4. The invention as defined in claim 1 wherein said body is of a one piece plastic construction.

5. The invention as defined in claim 1 and comprising an annular resilient seal contained in said body passageway.

6. The invention as defined in claim 1 wherein said urging means comprises a helical spring.

* * * * *